(12) United States Patent
Kuhlmann

(10) Patent No.: US 10,237,094 B2
(45) Date of Patent: Mar. 19, 2019

(54) METHOD FOR RECEIVING RADIO SIGNALS IN A RECEIVING DEVICE, AND RECEIVING DEVICE

(71) Applicant: Continental Automotive GmbH, Hannover (DE)

(72) Inventor: Peter Kuhlmann, Ehringshausen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/537,027

(22) PCT Filed: Dec. 10, 2015

(86) PCT No.: PCT/EP2015/079266
§ 371 (c)(1),
(2) Date: Jun. 16, 2017

(87) PCT Pub. No.: WO2016/096605
PCT Pub. Date: Jun. 23, 2016

(65) Prior Publication Data
US 2017/0346660 A1 Nov. 30, 2017

(30) Foreign Application Priority Data
Dec. 16, 2014 (DE) .......... 10 2014 226 141

(51) Int. Cl.
*H04B 17/30* (2015.01)
*H04L 25/02* (2006.01)
(Continued)

(52) U.S. Cl.
CPC ....... *H04L 25/0212* (2013.01); *H04B 17/309* (2015.01); *H04L 5/0048* (2013.01)

(58) Field of Classification Search
CPC ..... H04W 4/005; H04W 4/008; H04W 72/04; H04W 72/048; H04W 84/18; G01D 5/00; H04B 17/30; H04L 5/00
See application file for complete search history.

(56) References Cited

U.S. PATENT DOCUMENTS

| 2007/0072606 A1 | 3/2007 | van Rooyen |
| 2007/0149163 A1 | 6/2007 | Yasuta |

(Continued)

FOREIGN PATENT DOCUMENTS

| DE | 19747369 A1 | 5/1999 |
| DE | 102011017473 A1 | 10/2012 |

(Continued)

OTHER PUBLICATIONS

International Search Report and Written Opinion dated Feb. 29, 2016 from corresponding International Patent Application No. PCT/EP2015/079266.

*Primary Examiner* — Mohamed A Kamara

(57) ABSTRACT

Radio signals are received in a receiving device having an internal radio receiver that is designed to carry out a channel estimation for error correction, in the course of a receiving process of the radio signals received in a radio channel. The internal radio receiver communicates with an external radio receiver, which receives the same radio signals as the internal radio receiver at the measuring time, carries out a channel estimation for error correction, and transmits the channel estimation to the internal radio receiver, wherein the internal radio receiver uses the channel estimation of the external radio receiver in order to improve its own channel estimation.

20 Claims, 2 Drawing Sheets

(51) Int. Cl.
*H04B 17/309* (2015.01)
*H04L 5/00* (2006.01)

(56) References Cited

U.S. PATENT DOCUMENTS

| | | |
|---|---|---|
| 2007/0217540 A1 | 9/2007 | Onggosanusi et al. |
| 2010/0095180 A1* | 4/2010 | Sawai .................. H04L 1/0048 714/746 |
| 2011/0051636 A1* | 3/2011 | Van Nee .............. H04B 7/0452 370/310 |
| 2016/0198455 A1* | 7/2016 | Caretti ................. H04B 17/318 370/329 |

FOREIGN PATENT DOCUMENTS

| | | |
|---|---|---|
| DE | 102011017474 A1 | 10/2012 |
| DE | 102013106413 A1 | 1/2014 |

* cited by examiner

METHOD FOR RECEIVING RADIO SIGNALS IN A RECEIVING DEVICE, AND RECEIVING DEVICE

BACKGROUND

The invention relates to a method for receiving radio signals in a receiving device and a receiving device configured for carrying out the method. The receiving device tracks via an internal radio receiver, i.e. one integrated into the receiving device, which is configured to carry out, in the course of reception processing of the radio signals received in a radio channel, a channel estimation for error correction in a manner known per se.

Such a channel estimation is based on the fact that a measure for the distortion of the radio channel is formed by a Fourier pair which consists of a channel pulse response in the time domain of a channel transfer function in the frequency domain. During a channel estimation, one of the two variables channel pulse response or channel transfer functions is determined from data added to the signal to be transmitted, which are also designated as pilot information. This pilot information serves as reference to the receiver during the carrying out of the estimation of the channel characteristics. A channel estimation can then be applied to the received radio signals in order to carry out an error correction. Such a reception processing is necessary as a rule because the conditions of reception of radio receivers for radio systems are impaired, as a rule, by multipath reception. This applies to radio systems such as VHF, shortwave, mediumwave, longwave, digital radio mondiale (DRM), digital audio broad-casting (DAB), digital video broadcasting (DVB) or the like. The reason for this lies partially in a frequency-selective fading which is caused by scattering objects in the terrain. This applies both to stationary and also for mobile radio receivers. Whereas mobile radio receivers can change the situations of reception by changing the environment of reception, this remains the same in the case of stationary radio receivers so that appropriate possibilities of correction absolutely necessary.

Examples of stationary radio receivers are television sets and radio sets in apartments. In the case of mobile radio receivers, too, for example in vehicles (car radios) there are special cases in which the radio receiver is stationary for a number of minutes. Examples of this are waiting situations at rest stops, in front of the apartment of the car owner, at observation points during excursions or at parking places when shopping. This results in a virtually stationary situation of the receiver even if the receiving device as such is mobile.

The finding of whether the relevant radio receiver of a receiving device which is mobile per se is at least virtually stationary occurs in the case of motor vehicles, in general by evaluation of position information of a satellite locating system such as, e.g., from the Global Position System (GPS) which is available in most vehicles.

It is known to provide measures against effects from the multi-path reception in radio systems and to improve the signal quality. For example, the orthogonal frequency division multiplex method (OFDM) is known for this purpose, which is exclusively carried out in the radio receiver. In this context, a corresponding equalization of the signals, the radio channel estimation and the decoding of the signals takes place. This is subsequently also termed reception processing. This reception processing is carried out by corresponding calculations in a computer unit of the radio receiver.

Frequently, however, no corrections can be carried out within the radio receiver which lead to an adequate signal quality.

It is the object of the present invention, therefore, to achieve an improved reception processing of radio signals.

BRIEF SUMMARY

This object is achieved by a method having the features of claim 1 and a receiving device having the features of claim 11. In this context, it is provided, in particular, that the internal radio receiver communicates with an external radio receiver, i.e. one arranged away from the internal radio receiver, which, at the measuring time, receives the same radio signals as the internal radio receiver. The external radio receiver performs a channel estimation for error correction and conveys this channel estimation to the internal radio receiver. The latter uses the channel estimation of the external radio receiver for improving its own channel estimation. According to the invention, an external reception processing is thus carried out in addition to the internal reception processing. The external reception processing conveys, according to the invention, its information and results, particularly in the form of a channel estimation, to the internal reception processing so that the internal reception processing can be improved in accordance with this information.

In a special case, the external reception processing can also replace the internal reception processing completely when the decoded radio signal is conveyed directly to the internal radio receiver in usable form, i.e. particularly for the reproduction of the radio signal. This can be useful, for example, when the internal radio receiver is not able to receive any processable radio signal. Correspondingly, the internal reception processing can conversely also dismiss the information of the external reception processing in the special case and thus temporarily or permanently operate autonomously, for example if the signal of the internal radio receiver is qualitatively better than the signal of the external radio receiver.

According to the invention, the external radio receiver is operated in such a manner that it receives exactly the same input signals as the internal radio receiver at measuring time, i.e. at the measuring time. This can take place in one embodiment, for example, via an antenna splitter. In another embodiment, it is also possible to generate the same input signals by a digital transmission of sampled measurement values of the input signal.

Independently of the manner in which, according to the invention, the identical input signals are available in the internal radio receiver as in the external radio receiver, the external radio receiver is used for performing as optimal as possible a channel estimation. This is achieved, for example, by the fact that the external radio receiver, as a rule, has a very high computing power and a very good receiving sensitivity. This technically more elaborate and thus more expensive equipment of the external radio receiver is possible, according to the invention, in that an external radio receiver can communicate with a multiplicity of internal radio receivers. This justifies higher costs for a qualitatively better external receiver.

For the reception processing, the external radio receiver can also utilize radio prognoses in order to estimate the multipath reception on the basis of constructional environmental data.

Furthermore, the external receiver can utilize a highly accurate time standard, for example a rubidium standard or an atomic clock, for determining the time of reception precisely. Thus, the transmit signal can be determined accurately at the given point in time and there can be an optimum estimation of the transmit signal.

The communication link between the external radio receiver and the internal radio receiver can take place, for example, via radio or via a cable. Over this communication link, the external radio receiver can inform the internal radio receiver of its channel estimation which the internal radio receiver then utilizes in order to improve its own channel estimation from the same received data.

According to a preferred embodiment, it can be provided for this purpose that the internal radio receiver multiplies an inverse transmission function which is obtained from the channel estimation of the external radio receiver and which has been conveyed by the external radio receiver, by a Fourier transform of its own input signal. By this means, the internal radio receiver receives a very good estimation of the transmit signal so that it can set up its own channel decoding on this preprocessed signal.

Furthermore, it can be provided according to the invention that the internal radio receiver performs correlation calculations in order to harmonize the channel estimation of the external radio receiver with its channel estimation. This can take place particularly additionally to the direct use of the inverse transmission function by further calculations which are used for harmonizing the data determined by the external radio receiver with the internal data or bring them into correspondence, respectively. In a preferred example this is the calculation of the correlation of the external transfer function with the internally determined transfer function via the frequency band and the determination of the associated correction of the externally determined transfer function, e.g. a displacement with respect to the frequency offset.

According to the invention, it can also be provided that the internal radio receiver performs autonomous reception processing and checks whether by this means a better received signal is obtained than by using the data or the transfer functions of the external radio receiver. Correspondingly, the internal radio receiver can then also leave out the preprocessed signal of the external radio receiver in order to check whether a direct internal reception processing achieves similar or, against expectations, even better results than in the case of use of the data of the external radio receiver. In this case, the internal radio receiver can operate temporarily, or also permanently, autonomously.

According to the invention, it can also be provided that the internal radio receiver informs the external radio receiver of the result of a signal decoding performed by the internal radio receiver, the external radio receiver compares this result with the result of a signal decoding performed by the external radio receiver and determines corrections which are conveyed to the internal radio receiver by the external radio receiver. By this means, the computing power of the external radio receiver is utilized which is better in most cases. This can also take place in parallel to a reception and a reproduction of the radio signal by the internal radio receiver.

According to the invention, the communication between the internal radio receiver and the external radio receiver can only take place temporarily. This includes that the communication takes place only rarely or even only once. As a rule, such a rare or one-off communication is suitable for stationary internal receivers in which the most important scattering objects which produce the multipath reception such as houses or mountains are as a rule unchangeable and only change due to rare constructional measures or only over the seasons.

In another embodiment, the communication between the internal radio receiver and the external radio receiver to the extent that the communication link is possible, can also take place continuously. This is the case, in particular, with mobile internal radio receivers which frequently change their location of reception.

It is particularly in the case of an internal mobile receiver in a vehicle, particularly in a motor vehicle, that it can be provided that the receiver installed in the vehicle determines a relatively long standing time, determines its position, for example by interacting with a position recognition global position system (GPS) or the like, and stores an improved channel estimation in a database in a position-related manner. It can have determined this, for example, in a communication with an external radio receiver present at the current position.

These stored data can then be accessed by the internal receiver again when it is back at this position. This is appropriate, in particular, when the vehicle is waiting more frequently at recurring positions and a radio reception is intended to take place at this time.

Furthermore, it can be provided, according to the invention, for further improving the processing of the received signal, that the external radio receiver has direct access to the program content at the measuring time, for example because the external radio receiver is the transmitter itself or, for example, receives the program content via the internet. The external radio receiver can then generate the transmit signal independently without transmission losses and thus perform a particularly high-quality channel estimation.

It is particularly in the case of a local, stationary external radio receiver that a transfer function can also be predicted on the basis of a radiowave propagation model which takes into consideration terrain and building data at the location of the internal receiver. These can be stored, for example, in a corresponding database. By this means, the external radio receiver can establish both the prediction of the transfer function on the basis of a radiowave propagation model and its own received data for the channel estimation and correlate the results, for example with the usual mathematical techniques. This leads to a particularly high quality of channel estimation.

The invention also relates to a receiving device for radio reception in accordance with the parallel claim 11. The receiving device is equipped with an internal radio receiver which is configured to perform a channel estimation for error correction as part of reception processing of the radio signals received in a radio channel in a manner known per se. Furthermore, the receiving device has an external radio receiver which is configured to perform a channel estimation for error correction as part of reception processing of the radio signals received in a radio channel in a manner known per se, possibly even identical manner as the internal radio receiver. Between the receiving device with the internal radio receiver and the external radio receiver, a radio communication or a cable-connected communication can take place, in particular.

According to the invention, it is provided that both the external radio receiver and the internal radio receiver have a communication unit for communication between one another and have in each case a computing unit, the computing units of the internal radio receiver and of the external radio receiver, possibly also in interaction, being configured in each case for performing the method described before or parts thereof.

The particular advantage of the present invention lies in proposing an external radio receiver, which is technically elaborate as a rule, in parallel with an internal radio receiver of the receiving device in order to improve the channel estimation of the internal radio receiver, which, as a rule, is technically simpler. The external radio receiver has a multiplicity of aids as mentioned by way of example, in order to perform a channel estimation which is as good as possible or optimal. It then informs the internal radio receiver of this particularly good channel estimation, which internal radio receiver performs a preprocessing and a correction of the radio signals received by it on this basis.

Further advantages, features and possible applications of the present invention are also obtained from the subsequent description of illustrative embodiments and the drawing, wherein all features described and/or represented pictorially or by themselves or in arbitrary combination form the subject matter of the present invention, also independently of their composition in the claims or their references.

DETAILED DESCRIPTION

Figure 1:
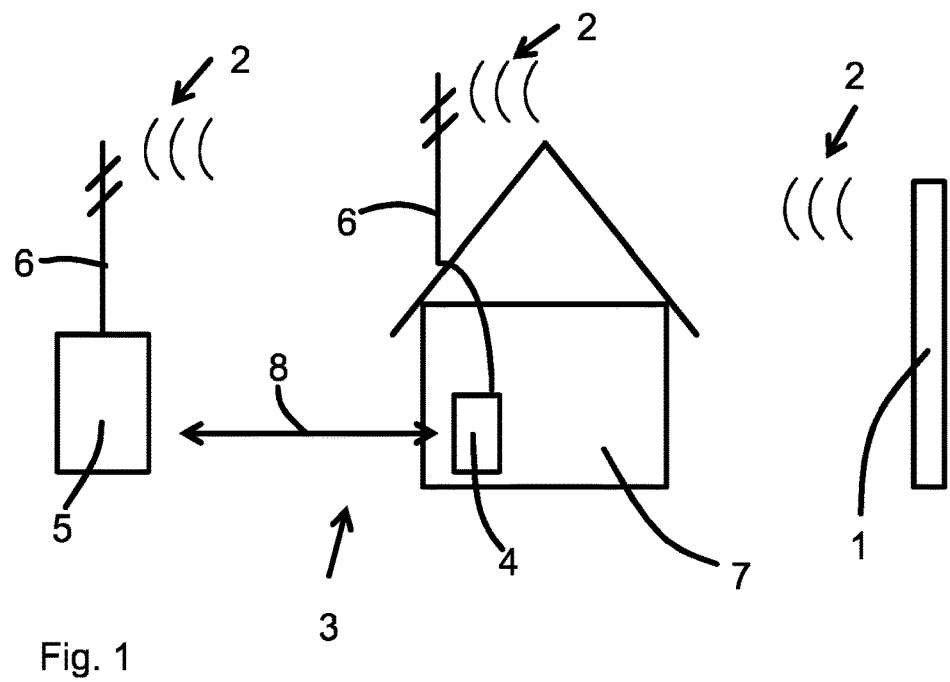
FIG. 1 shows diagrammatically a receiving device according to the invention having a stationary internal receiver.

In FIG. 1, a radio transmitter 1 is shown which emits a radio signal 2.

The radio signal 2 is received by a receiving device 3 according to the invention which has an internal radio receiver 4 and an external radio receiver 5 which in each case receive signals via antennas 6 allocated to them. For example, the internal radio receiver 4 is a stationary television receiver in a residential house 7 with a stationary antenna 6 designed as roof antenna. During the installation of the roof antenna 6, the installer consults the external radio receiver 5 in order to perform a good or optimal channel estimation and to correct effects due to the multipath reception.

The external radio receiver 5 can be, for example, a high-quality radio receiver brought along by the installer, having high computing power and good receiving sensitivity which, for example, is mounted in a vehicle or is set up by the installer at a suitable location. Between the internal radio receiver 4 and the external radio receiver 5 there is a communication link 8, e.g. by radio or via a cable.

The scattering conditions at the location of reception, estimated by the external radio receiver 5, are conveyed by the external radio receiver 5 to the internal (stationary) radio receiver 4 via the communication link 8, e.g. a radio link or a USB cable. The internal radio receiver 4 uses the transfer function, conveyed to it, of the external radio receiver 5 in order to calculate the reflections known thereby at the location of reception, from the received signal and thus to estimate the transmit signal (radio signal 2) well. This estimated transmit signal is then used as basis for the signal decoding.

This preprocessing (particularly channel estimation) is continuously utilized in the later operation so that it runs automated. The external radio signal 5 can be used from time to time for bringing the correction signal for the preprocessing to a new status, e.g. during maintenance of the receiving device 3 or when the external radio receiver 5 is available.

If the external radio receiver 5 is a permanently installed external radio receiver 5, e.g. in a settlement, for improving the channel estimation it can also communicate e.g. via the Internet as communication link 8 with the internal radio receiver 4 in order to update the correction signal to the latest status.

It is particularly in the case of a permanently installed external radio receiver 5 that the latter can also use for a reception processing a high-quality radiowave propagation model which is able to predict on the basis of a very accurate terrain and building database the transfer function at the location of the internal receiver at the measuring time. It transfers this transfer function to the internal radio receiver 4 which uses this information in the manner described already initially in order to improve its own channel estimation.

Additionally, the external radio receiver 5 can also use a combination of a channel estimation from a radiowave propagation model and the radio signals 2 actually received in order to perform a second estimation of the transfer function. It evaluates both estimations and conveys by the evaluations as optimal determined transfer function to the internal radio receiver 4. Optionally, the internal radio receiver 4 can also receive both transfer functions and evaluate them itself.

Figure 3:
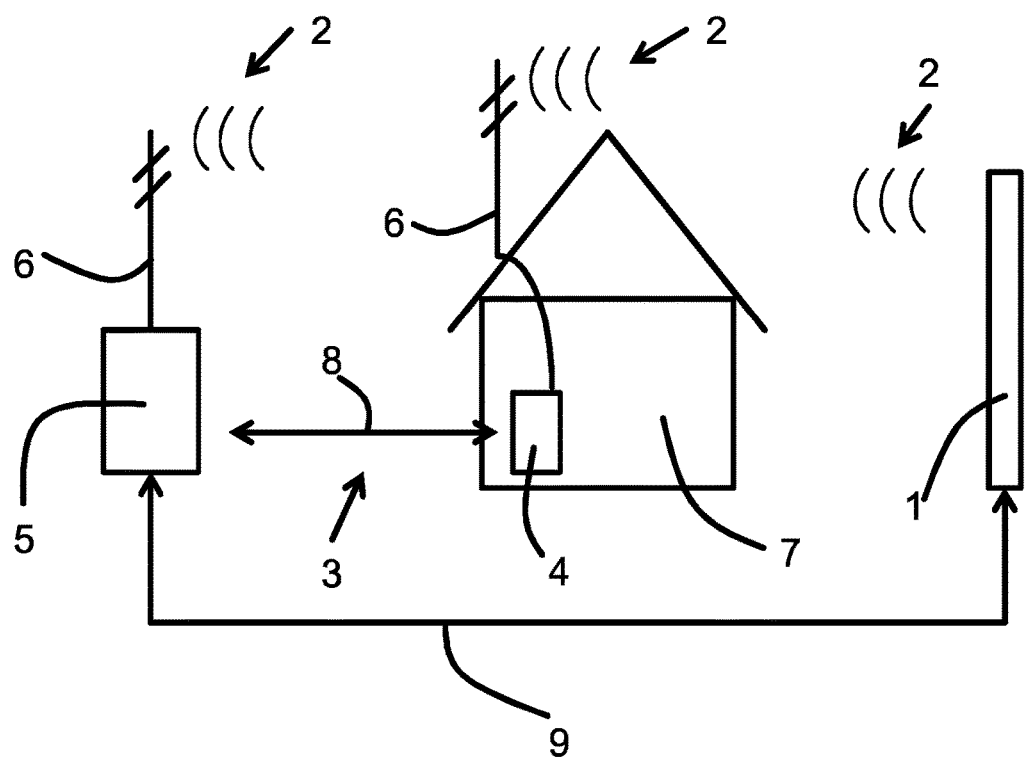
FIG. 3 shows diagrammatically a variant of the embodiment according to FIG. 1.

FIG. 3 shows a variant of the embodiment according to FIG. 1 in which an internet link 9 (or comparative communication link) exists additionally between the radio transmitter 1 and the external radio receiver 5. Via this internet link 9, the external radio receiver 5 has access to the complete program content at the measuring time, i.e. at the transmission and reception time of the radio signals 2. On the basis of these signals which are faultless and not disturbed because of multipath reception or the like, with the complete program content, the external radio receiver 5 can independently calculate the transmit signal which matches the current measuring time. If necessary, it also has direct access to the transmit signal which is transmitted to it directly by the radio transmitter 1.

By this means, the external radio receiver can perform an optimum channel estimation because it receives the signal to be reconstructed by another way in parallel with the radio signal 2 and can thus perform an optimum channel estimation.

Figure 2:
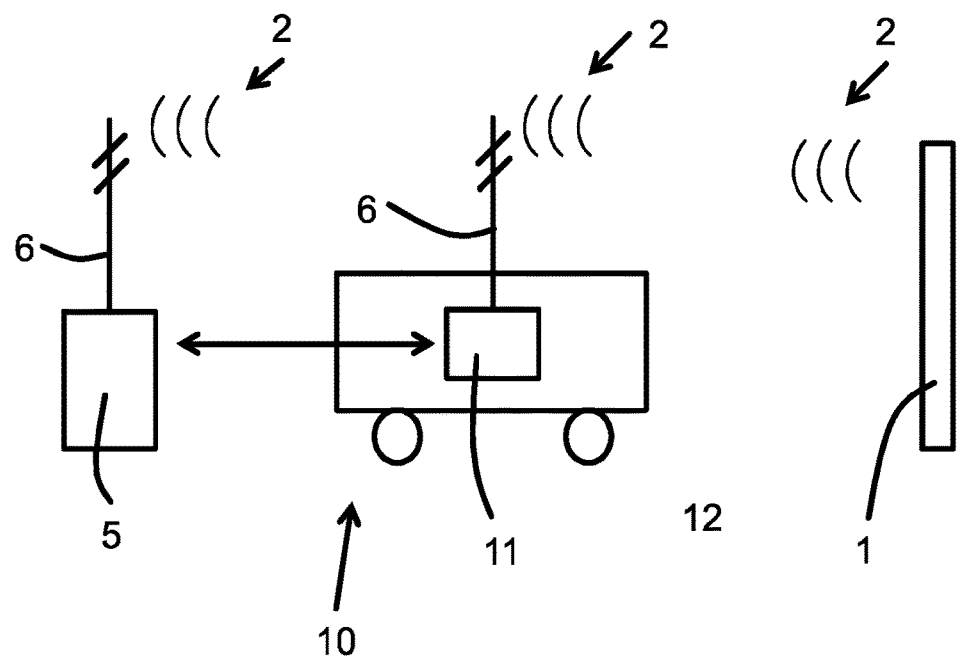
FIG. 2 shows diagrammatically an illustrative embodiment of the present invention having a mobile internal receiver.

FIG. 2 shows a further embodiment of the present invention having a receiving device 10 which has an external radio receiver 5 with antenna 6 for receiving radio signals 2 and an internal receiver 11 with antenna 6 for receiving radio signals 2 which are sent out by a radio transmitter 1.

In contrast to the internal radio receiver 4 according to the embodiments in FIGS. 1 and 3, the internal radio receiver 11 is in a vehicle 12. The internal radio receiver 11, as mobile radio receiver, remembers the stopping positions in all situations in which the vehicle 12 is standing for a relatively long time and uses an accurate time standard. For example, a time stamp determined by the control channel of the radio system can be used as time standard. In the example of Digital Audio Broadcasting (DAB), a Fast Information Group (FIG) 0/10 is available for this purpose.

If the internal radio receiver 11 detects a situation in which it is standing in one position for a relatively long time, it transfers its received measurements for a certain period of time together with its position and its clock time obtained from the precise period of time preferably via radio to the external radio receiver 5. The latter transfers the estimated transmit signal which is based on its received signal which has been measured at the relevant point in time, back to the internal radio receiver 11.

The external radio receiver 5 may under certain circumstances instead convey the transmit signal itself, that is to say the optimum received signal at the precise measuring time, to the internal radio receiver 11 if the external radio receiver 5 has knowledge of the transmit signal at the relevant measuring time.

The internal radio receiver 11 utilizes this estimated signal in order to improve its channel estimation for the given position. It can store all information relating to this correction measure position-dependently and later load it again and use it as soon as the internal radio receiver 11 with the vehicle 12 reaches the relevant position again and determines that it is at rest at this position.

The invention claimed is:

1. A method for receiving radio signals in a receiving device which has an internal radio receiver which is configured to perform as part of processing reception of the radio signals received in a radio channel, a channel estimation for error correction, the method comprising:
   at the internal radio receiver, communicating with an external radio receiver;
   at the external radio receiver:
      at a measuring time, receiving the same radio signals as are received by the internal radio receiver,
      performing a channel estimation for error correction, and
      conveying the channel estimation to the internal radio receiver; and
   at the internal radio receiver, utilizing the channel estimation of the external radio receiver for improving the internal radio receiver's own channel estimation.

2. The method as claimed in claim 1, characterized in that the internal radio receiver multiplies an inverse transfer function which is obtained from the channel estimation of the external radio receiver and which has been conveyed by the external radio receiver, by a Fourier transform of its own input signal.

3. The method as claimed in claim 1, characterized in that the internal radio receiver performs correlation calculations in order to harmonize the channel estimation of the external radio receiver with its channel estimation.

4. The method as claimed in claim 1, characterized in that the internal radio receiver performs autonomous reception processing and checks whether by the autonomous reception processing a better received signal is obtained.

5. The method as claimed in claim 1, characterized in that the internal radio receiver informs the external radio receiver of the result of a signal decoding performed by the internal radio receiver, the external radio receiver compares this result with the result of a signal decoding performed by the external radio receiver and determines corrections which are conveyed to the internal radio receiver by the external radio receiver.

6. The method as claimed in claim 1, characterized in that the communication between the internal radio receiver and the external radio receiver only takes place temporarily.

7. The method as claimed in claim 1, characterized in that the communication between the internal radio receiver and the external radio receiver takes place continuously.

8. The method as claimed in claim 1, characterized in that the internal radio receiver is installed in a vehicle and determines a relatively long standing time, determines its position and stores an improved channel estimation in a database in a position-related manner.

9. The method as claimed in claim 1, characterized in that the external radio receiver has access to program content at the measuring time and generates the transmit signal independently.

10. The method as claimed in claim 1, characterized in that the external radio receiver predicts a transfer function on the basis of a radiowave propagation model on the basis of a terrain and building database at a location of the internal radio receiver.

11. A receiving device for radio reception via an internal radio receiver which is configured to perform a channel estimation for error correction as part of reception processing of the radio signals received in a radio channel and having an external radio receiver which is configured to perform a channel estimation for error correction as part of reception processing of the radio signals received in a radio channel, the receiving device comprising:
   the external radio receiver and the internal radio receiver having a communication unit for communication between one another and having in each case a computing unit, the computing units of the internal radio receiver and of the external radio receiver being configured in each case for performing operations comprising:
      at the internal radio receiver, communicating with the external radio receiver;
      at the external radio receiver:
         at a measuring time, receiving the same radio signals as are received by the internal radio receiver,
         performing a channel estimation for error correction, and
         conveying the channel estimation to the internal radio receiver; and
      at the internal radio receiver, utilizing the channel estimation of the external radio receiver for improving the internal radio receiver's own channel estimation.

12. The receiving device as claimed in claim 11, the internal radio receiver multiplies an inverse transfer function which is obtained from the channel estimation of the external radio receiver and which has been conveyed by the external radio receiver, by a Fourier transform of its own input signal.

13. The receiving device as claimed in claim 11, the internal radio receiver performs correlation calculations in order to harmonize the channel estimation of the external radio receiver with its channel estimation.

14. The receiving device as claimed in claim 11, the internal radio receiver performs autonomous reception processing and checks whether by the autonomous reception processing a better received signal is obtained.

15. The receiving device as claimed in claim 11, the internal radio receiver informs the external radio receiver of the result of a signal decoding performed by the internal radio receiver, the external radio receiver compares this result with the result of a signal decoding performed by the external radio receiver and determines corrections which are conveyed to the internal radio receiver by the external radio receiver.

16. The receiving device as claimed in claim 11, the communication between the internal radio receiver and the external radio receiver only takes place temporarily.

17. The receiving device as claimed in claim 11, the communication between the internal radio receiver and the external radio receiver takes place continuously.

18. The receiving device as claimed in claim 11, the internal radio receiver is installed in a vehicle and determines a relatively long standing time, determines its position and stores an improved channel estimation in a database in a position-related manner.

19. The receiving device as claimed in claim 11, the external radio receiver has access to program content at the measuring time and generates the transmit signal independently.

20. The receiving device as claimed in claim 11, the external radio receiver predicts a transfer function on the basis of a radiowave propagation model on the basis of a terrain and building database at a location of the internal radio receiver.

\* \* \* \* \*